United States Patent [19]

Strock

[11] 3,898,557

[45] Aug. 5, 1975

[54] ELECTRICAL DEVICE FOR TESTING A GROUND FAULT CIRCUIT INTERRUPTER

[75] Inventor: Joseph P. Strock, Syracuse, N.Y.

[73] Assignee: Daltec Systems, Inc., Syracuse, N.Y.

[22] Filed: Apr. 15, 1974

[21] Appl. No.: 460,765

Related U.S. Application Data

[63] Continuation-in-part of Ser. No. 414,631, Nov. 12, 1973, abandoned.

[52] U.S. Cl. .................................................. 324/51
[51] Int. Cl. ............................................ G01r 31/02
[58] Field of Search ................ 324/51, 66; 340/255; 317/18 B, 18 D

[56] References Cited
UNITED STATES PATENTS

| | | | |
|---|---|---|---|
| 2,131,386 | 9/1938 | Mishelevich | 340/255 |
| 2,382,647 | 8/1945 | McLoughlin et al. | 340/255 |
| 2,623,107 | 12/1952 | Baughman | 340/255 |
| 3,176,219 | 3/1965 | Behr | 324/51 |
| 3,205,436 | 9/1965 | Donahue | 324/51 |
| 3,263,164 | 7/1966 | Solgere | 324/51 |
| 3,376,502 | 4/1968 | Rink | 324/51 |
| 3,668,518 | 6/1972 | Shapiro | 324/66 X |

FOREIGN PATENTS OR APPLICATIONS

| | | | |
|---|---|---|---|
| 628,667 | 9/1949 | United Kingdom | 324/51 |
| 785,539 | 10/1957 | United Kingdom | 324/51 |
| 807,544 | 1/1959 | United Kingdom | 324/51 |

*Primary Examiner*—Gerard R. Strecker
*Attorney, Agent, or Firm*—Bruns & Jenney

[57] ABSTRACT

An electrical circuit for extensive testing of a ground fault interrupter. Means to create a current differential between the hot and neutral conductors of a ground fault interrupter device, and thereby test the circuit interrupt features of said device, are disclosed. Means are also provided for determining the sensitivity of the device being tested to an accidental grounding of the neutral conductor. The invention also can be used to check the wiring connections between the ground fault interrupter and the electrical system to which it is attached. A further advantage of the invention is that it provides an indirect test of said electrical system. Modifications to the circuitry will provide similar testing devices for two and three phase ground fault interrupters.

6 Claims, 7 Drawing Figures

ELECTRICAL DEVICE FOR TESTING A GROUND FAULT CIRCUIT INTERRUPTER

CROSS-REFERENCE TO RELATED APPLICATION

This application is a continuation-in-part of application Ser. No. 414,631, now abandoned, filed Nov. 12, 1973 by the same inventor under the same title.

BACKGROUND OF THE INVENTION

This invention relates to a testing device for a ground fault interrupter.

Electrical ground faults caused by such things as defective or worn insulation, moisture, faulty construction of appliances, or a defect in an electrical circuit can result in an electric current flowing from a charged (hot) wire to ground. Unfortunately, one path to ground used by this runaway current is through the body of a person in contact with the electrical system.

Devices, called ground fault interrupters (G.F.I.), have been developed which automatically open a circuit upon sensing a ground fault. However, with the gravity of the danger involved, these devices should be subject to continual checks of their effectiveness. Some specific instances where a tester is needed are as follows:

As in all mass produced articles some G.F.I.'s will be defectively manufactured and other G.F.I.'s will be damaged by abusive treatment during shipment; therefore, the device should be tested both before packaging and immediately after receipt.

An electrician charged with installing a permanent G.F.I. needs a portable, inexpensive device to test his work to insure proper wiring.

A G.F.I. in use for a period of years can deteriorate from normal use or from abusive treatment and someone not familiar with the history of a particular G.F.I. will be interested in knowing if he can trust the device.

A man who has inadvertently dropped a portable G.F.I. will want assurance that no wire has loosened, or the owner of a G.F.I. installed near an outdoor swimming pool will want to be positive that no moisture has leaked into his device destroying its effectiveness.

The above list isn't intended to be exhaustive but merely indicative of the need.

SUMMARY OF THE INVENTION

The testing device of this disclosure is designed for use in all situations calling for the testing of a G.F.I. The circuitry of the invention will conduct four separate tests: (1) when plugged into the G.F.I. or a circuit protected by a G.F.I. it will indicate whether the ground terminal of the G.F.I. has been physically connected to the electrical system's ground; (2) it will determine whether the hot wire has been attached to the proper terminal on the G.F.I.; (3) it will show the sensitivity of the G.F.I. to an accidental grounding of the neutral conductor, and (4) it will test the G.F.I.'s circuitry that detects a current differential between the charged and neutral conductors. The first two tests listed above are also indirect tests of the electrical system. Before the G.F.I. can function properly, the electrical system to which it is connected must be properly wired.

Another advantage of the tester is its ease of use. Designed to be small in size, it is therefore portable; designed simply, it is therefore usable by those with little knowledge of the principles of electricity.

A further advantage of the tester is its availability. Designed to be inexpensively constructed, it is within the financial means of all who should have a device for testing the effectiveness of a G.F.I.

DESCRIPTION OF THE PREFERRED EMBODIMENT

Figure 1:
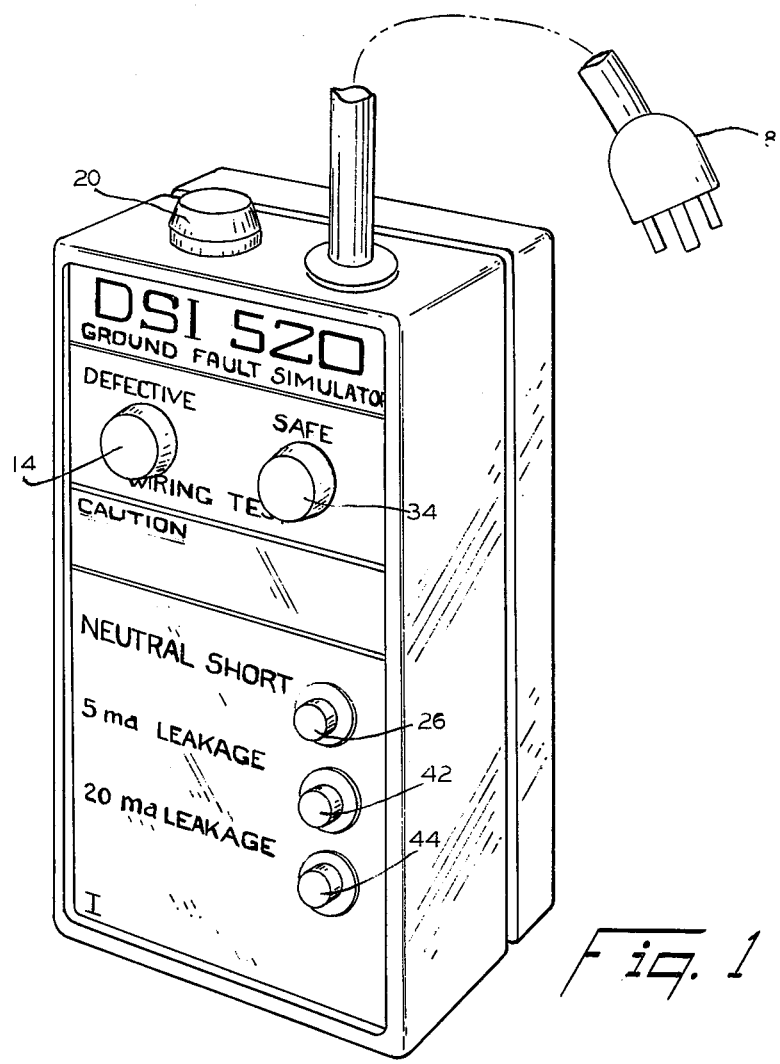
FIG. 1 is a perspective view of a testing device embodying the invention.
Figure 2:
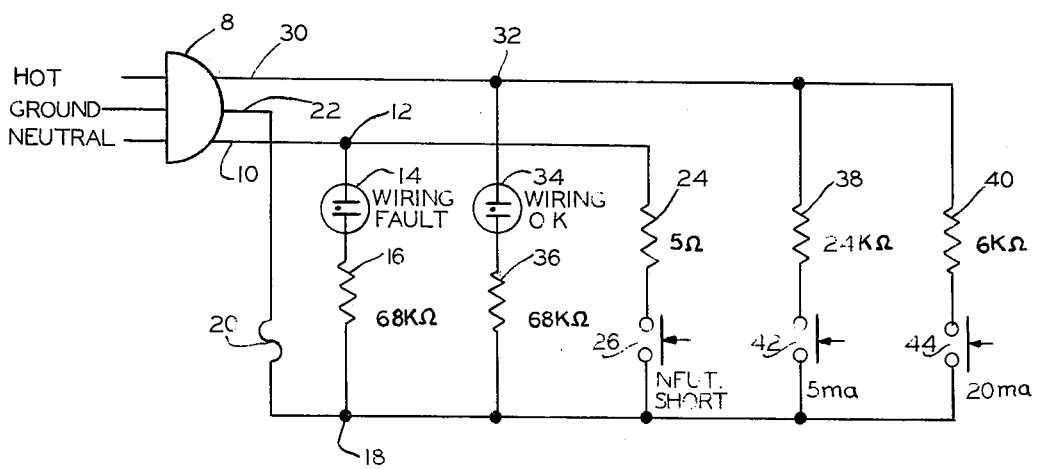
FIG. 2 is a schematic diagram of the electrical circuit for the testing device.

Having reference now to FIG. 2, the testing circuit includes a three prong plug 8 designed to fit the standard receptacles of a G.F.I. or a circuit protected by a G.F.I. (not shown). For a description of the construction and operation of a G.F.I., reference is made to U.S. Pat. No. 3,813,579 granted May 28, 1974 to Richard C. Doyle et al. The neutral (uncharged) wire 10 is connected to reference point 12. Reference point 12 connects through lamp 14 and resistor 16 to reference point 18. Reference point 18 is in turn connected through fuse 20 to the ground wire 22 of the plug. Reference point 12 is also connected through resistor 24 and switch 26 to ground reference point 18.

The hot (charged) wire 30 is connected to reference point 32. Reference point 32 is connected through lamp 34 and resistor 36 to ground reference point 18. Reference point 32 is also connected through resistors 38 and 40 and switches 42 and 44 respectively to ground reference point 18.

The operation of the circuit just described is as follows. With the G.F.I. connected to an electrical circuit — assumed for this preferred embodiment to be a single phase 120 V. system — plug 8 of the tester is inserted into the G.F.I. receptacles (not shown). If the designated hot wire receptacle is the actual receptacle charged, the current will flow through reference point 32 into lamp 34 and resistor 36, then to ground reference point 18. The current will light lamp 34 indicating proper wiring of both the G.F.I. and the electrical system to which the G.F.I. is attached.

The preferred embodiment utilizes a neon lamp type NE51. With this lamp, a resistance of 50,000 to 70,000 ohms is necessary to lower the current level in the circuit. Here, a resistance of 68,000 ohms is used. If a different type lamp is used a high resistance is still required in this path to prevent the tripping mechanism of the G.F.I. (not shown) from being activated. Since the lowest current leakage rating of a standard G.F.I. is 5 milliamps the standard tester requires a resistance of more than 24,000 ohms.

If the receptacle designated as neutral is inadvertently the hot receptacle, the current will flow from reference point 12 through neon lamp 14 and resistor 16 to ground reference point 18. As can be seen, this circuit path is identical to that described above; therefore, the same restrictions apply. The lighting of this second lamp indicates faulty wiring of either the G.F.I. or the electrical system. No further tests should be performed until this problem is corrected.

As can be seen from FIG. 2, if the ground receptacle isn't connected to a good ground both circuits 12 to 22 and 32 to 22 will be open circuits. If this happens, either because the electrical system isn't grounded or the G.F.I.'s ground receptacle isn't connected properly, neither lamp will light. When this is the situation the defect should be corrected before further tests.

When the wiring tests have been completed satisfactorily, the sensitivity of the G.F.I. to accidental ground of the neutral wire 10 is determined. Because of the construction of a standard G.F.I. if a low impedance ground occurs on the neutral conductor, the differential transformer (not shown) within the G.F.I. would be incapable of generating sufficient power in the transformer core to activate the circuit breaker.

With switch 26 closed, the neutral wire effectively becomes a low impedance ground as seen in FIG. 2. The 5 ohm resistor 24 is used to simulate the impedance which is inherent in the physical elements of any electrical system. If there is an interruption, as seen from an indicator on the G.F.I., or from an extinguishing of lamp 34, this device is reasonably sensitive to a grounding of the neutral wire. If there is no interruption the G.F.I. should be repaired before further use.

After a successful completion of the neutral short test, the current differential test is performed. With the G.F.I. reset either switch 42 or 44 is closed, the choice depending upon the trip rating of the particular G.F.I. being tested. Since the standard G.F.I.'s have trip ratings of 5 or 20 milliamps, the resistors in series with these switches are chosen accordingly. With a voltage of 120 volts a carbon resistor 38 of 24,000 ohms will draw 5 milliamps through switch 42, while a carbon resistor 40 of 6,000 ohms will draw 20 milliamps through switch 44. Since it is obvious that G.F.I.'s with trip ratings other than 5 or 20 milliamps are very possible it is not intended that this embodiment limit the scope of this invention.

It is a G.F.I.'s purpose to open any circuit with more than a predetermined differential or current between the hot and neutral conductors. With the proper switch closed, current equal to the minimum trip current will flow from hot to ground. This will create a current differential between the hot and neutral wires equal to this trip current, thereby activating the interrupt mechanism of a properly functioning G.F.I. If no interrupt of the current takes place — as seen from an indicator on the G.F.I. or from a failure of lamp 34 to be extinguished — the G.F.I. is defective. No use of an improperly functioning G.F.I. should be made until the defect is repaired.

The operation of fuse 20 is obvious, it will break the circuit if the current should exceed a safe level. For this particular embodiment a one amp. fuse is used.

Figure 3:
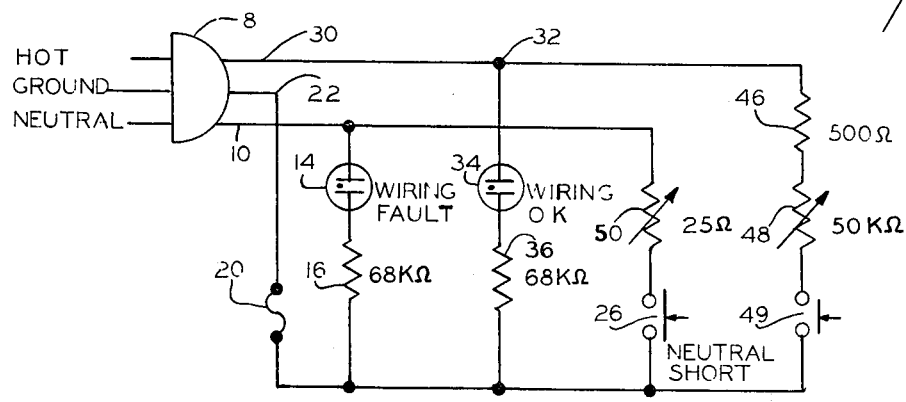
FIG. 3 is a modification of the circuit of FIG. 2 which uses variable resistors in place of fixed value resistors.

FIG. 3 is a schematic diagram of the circuit of FIG. 2 with the following modifications. The two parallel circuits of FIG. 2, consisting of resistors 38 and 40 and switches 42 and 44 are replaced by a single circuit of resistor 46, variable resistor 48 and switch 49. Also resistor 24 is replaced by variable resistor 50. Both variable resistors are attached to pre-calibrated dials (not shown).

The operation of this circuit is the same as the operation of the circuit of FIG. 2 up to the neutral short test. But while the embodiment of FIG. 2 is able to test the sensitivity of a G.F.I. to a grounded neutral short with an impedance of 5 ohms only, this modification will permit testing of the sensitivity over a range of low impedance. With switch 26 closed, the neutral wire effectively becomes a low impedance ground as seen in FIG. 3. By presetting the value of the resistor 50 the rated trip level of the G.F.I. can be tested; by varying the setting of the resistor 50 the actual trip value of the G.F.I. can be evaluated.

A further variation in the operation of the embodiment of FIG. 2 is provided by variable resistor 48. While the embodiment of FIG. 2 is able to test only two fixed values of differential current on a 120 volt system, this modification can test G.F.I.'s over a range of leakage current rating and voltage levels.

With switch 49 closed there is a path for current between the hot and ground wires thereby causing a current variance between the hot and neutral wires equal to the current going to ground. Knowing the voltage of the system and the rating of the G.F.I., the pre-calibrated dial for resistor 48 can be set to the conductance level that will artifically create the desired ground fault condition. By varying the resistance value the trip level of this G.F.I. can be evaluated.

In the embodiment of FIG. 3, for a 120 volt system, with switch 49 closed and variable resistor 48 set at zero ohms, 240 milliamps will flow from the hot wire to ground. Resistor 46 was included to prevent a total short circuit and the destructively high current that would result. In the same circuit with the variable resistor set at 50,000 ohms 2.4 milliamps will flow. By varying the resistor between 0 and 50,000, currents between 2.4 and 240 milliamps are obtained.

By doubling the values of milliamps listed above one would have the differential current created by this device in a 240 volt system.

Figure 4:
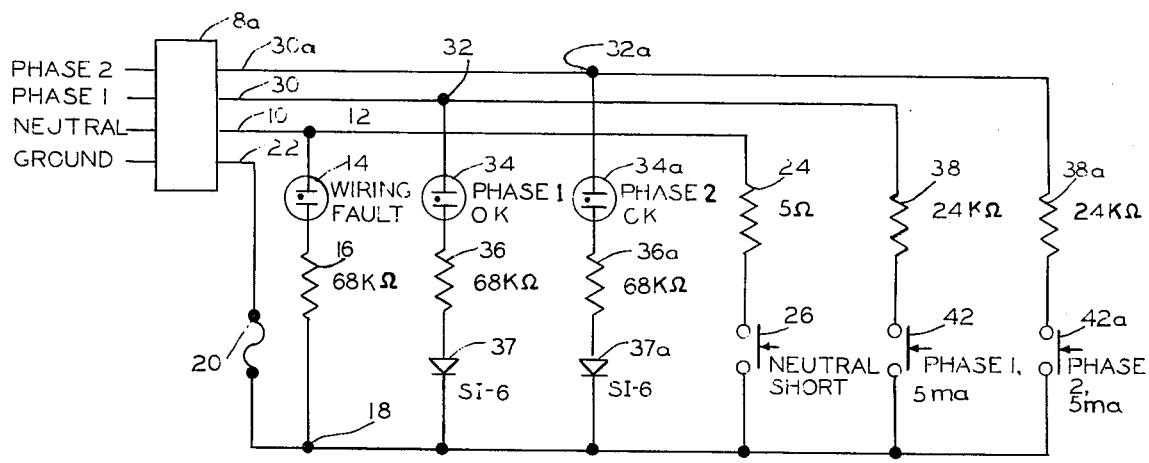
FIG. 4 is a modification of the circuit of FIG. 2 for testing a two phase circuit.

FIG. 4 is a schematic of a modification of this invention which can be used to test a two phase circuit. This two phase tester is basically the one phase tester of FIG. 2, with additional circuitry to test the G.F.I.'s operation as it relates to the second hot wire 30a. One minor difference between the two embodiments of the basic invention is the addition of diode 37, type SI-6, in series with lamp 34 and resistor 36. This diode will prevent the lamp from lighting if ground 22 is open. A second difference is the deletion of the 20 milliamp test switch 44 and resistor 40 as currently available two phase G.F.I.'s are only rated at 5 milliamps.

With the addition and deletion listed above, the test circuitry of FIG. 2 for the hot wire is duplicated. Hot wire 30a is connected to reference point 32a. Reference point 32a is connected through lamp 34a, resistor 36a and diode 37a to ground reference point 18. Reference point 32a is also connected through resistor 38a and switch 42a to ground reference point 18.

The operation of this modification is similar to the operation of the principal embodiment of this invention. However, one difference is that there are two wiring lights that must be glowing to indicate that both hot wires are connected properly. Both lamps 34 and 34a should light upon inserting plug 8a into the G.F.I.'s receptacles.

A second operational difference is that after switch 42 is closed and has successfully interrupted the circuit, the G.F.I. is reset and switch 42a is closed. Since 5 milliamps of current flow to ground, there is a variance of current between the second hot wire and neutral wire equal to 5 milliamps. The G.F.I. should, therefore, trip out as described in FIG. 2; if it doesn't, the G.F.I. is defective.

Figure 5:
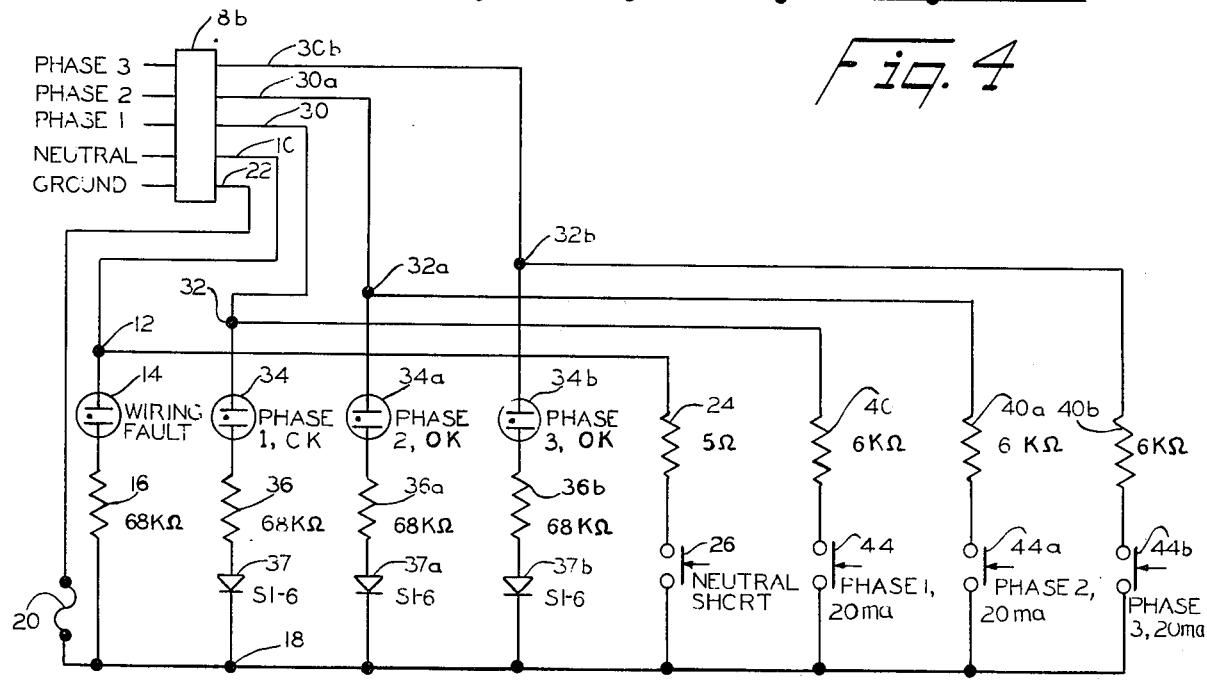
FIG. 5 is a modification of the circuit of FIG. 2 for testing a three phase circuit.

FIG. 5 is a schematic of a modification of this invention to be used for testing a three phase circuit. This three phase tester is basically the two phase tester of FIG. 4 with additional circuitry to test the G.F.I.'s operation as it relates to the third hot wire 30b. A difference between the two phase tester of FIG. 4 and the base circuitry of this embodiment is that the resistance used in the current differential test is 6,000 ohms instead of 24,000 ohms. This change is necessitated by the present practice of building all three phase G.F.I.'s with trip current of 20 milliamps.

Hot wire 30b is connected to reference point 32b. Reference point 32b is connected through lamp 34b, resistor 36b and diode 37b to ground reference point 18. Reference point 32b is also connected through resistor 40b and switch 44b to reference point 18.

The operation of this modification is similar to the operation of the two phase tester of FIG. 4. One difference is that there are three wiring lights that must be glowing to indicate that all three hot wires are connected properly.

A second operational difference is that after switches 44 and 44a have been closed and the G.F.I. worked properly the G.F.I. is reset and switch 44b is closed. This completed circuit will cause a 20 milliamps difference between the third hot wire and the neutral wire and thereby cause a properly functioning G.F.I. to trip out as described in FIG. 2. If there is no interruption of current the G.F.I. is defective.

It is intended that the modification of FIG. 3 be applicable to the two and three phase testers of FIGS. 4 and 5, allowing both varying values of the neutral short impedance and varying values of current differential. It is also intended that the conductance values given to resistors 40, 40a and 40b and resistors 38 and 38a not be limitations on the scope of this invention. As different voltages are tested or as different current differential ratings come into use, the invention can be made applicable by changing the values of these resistors.

Figure 6:
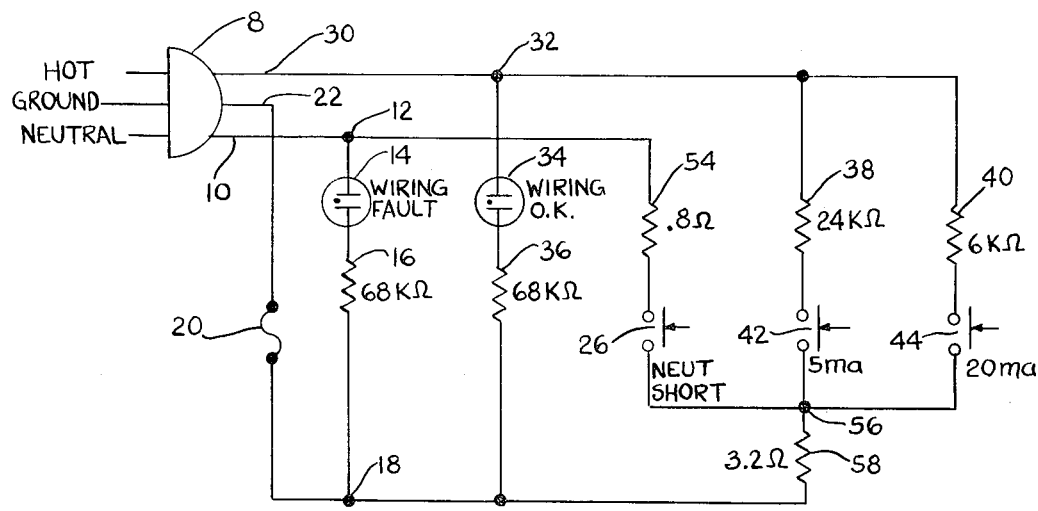
FIG. 6 is a modification of the circuit of FIG. 2 for testing a second type of G.F.I. for a neutral short.
Figure 7:
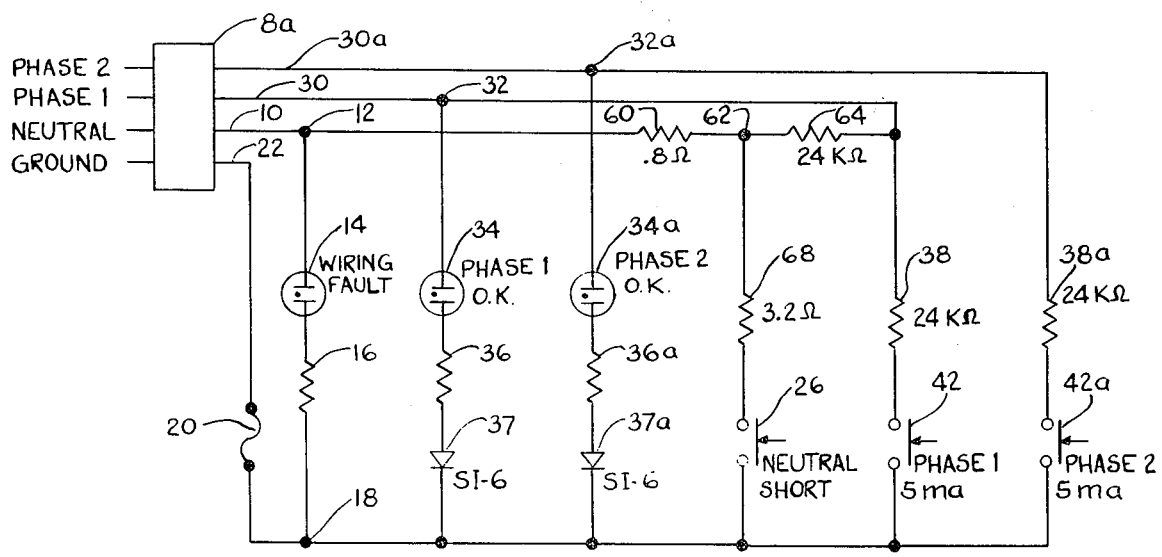
FIG. 7 is a modification of the circuit of FIG. 4 for testing a second type G.F.I. for a neutral short.

FIGS. 6 and 7 show circuits which enable this device to test the sensitivity of a second type G.F.I. to a neutral short. FIG. 6 is a schematic diagram of the circuit of FIG. 2 with the following modification: an 0.8 ohm resistor 54 replaces the 5 ohm resistor 24 of FIG. 2; and switches 26, 42 and 44 are connected through a common reference point 56, which is connected through a 3.2 ohm resistor 58 to ground reference point 18.

FIG. 7 is a schematic diagram of the circuit of FIG. 4 with the following modifications: Reference point 12 is connected through an 0.8 ohm resistor 60 to a reference point 62. Reference point 62 is in turn connected through a 24,000 ohm resistor 64 to reference point 32. Reference point 62 is also connected through a 3.2 ohm resistor 68 to neutral short switch 26.

The operation of the circuit of FIG. 6 is the same as the operation of the circuit of FIG. 2 with two exceptions. First, in the current differential test, when switch 42 or switch 44 is tripped, resistor 58 is part of the total resistance in the circuit which determines the amount of current leaked to ground. However, as the resistance of resistor 58 is small, as compared to the resistance of resistors 38 and 40 its effect is slight and is therefore ignored.

The second and major difference between the operation of the circuit of FIG. 6 and the operation of the circuit of FIG. 2 is in the neutral short test. The modified neutral short test of this circuit is designed to work for either of the two types of G.F.I.'s on the market today. With just switch 26 tripped the neutral wire 10 effectively becomes a low impedance ground, as seen in FIG. 6, with resistors 54 and 58 simulating the impedance which is inherent in the physical elements of the electrical circuit. This first step, by itself, will cause an interrupt in the first type G.F.I.

If, after the first step, there is no interrupt then, with switch 26 still tripped, either switch 42 or switch 44 is tripped depending on the G.F.I. rating. With these two switches tripped, approximately 80 percent of the rated leakage current flows to neutral wire 10 through reference point 56, resistor 54 and reference point 12. The remaining leakage current flows to ground 22 through reference point 56, resistor 58 and ground reference point 18. The second type G.F.I. should be interrupted under these conditions; if there is no interruption, the G.F.I. should be considered defective.

The operation of the circuit of FIG. 7 is similar to the operation of the circuit of FIG. 4 but, as in the circuit of FIG. 6, this circuit is designed to provide the neutral short test for both types of G.F.I.'s on the market. With switch 26 tripped, the neutral wire 10 effectively becomes a low impedance ground, as seen in FIG. 7, with resistors 60 and 68 simulating the impedance which is inherent in the physical elements of the electrical circuit. This condition by itself will cause an interrupt in the first type G.F.I. Also, with switch 26 tripped, resistors 60 and 64 draw approximately 80 percent of the rated trip current which flows to the neutral wire 10 through reference point 12. Resistors 64 and 68 draw approximately 20 percent of the rated trip current to ground 22 through reference point 18. The second type G.F.I. should interrupt under these conditions; if there is no interrupt the G.F.I. should be considered defective.

From the above description it is apparent that the circuits of FIGS. 3 and 5 can be modified to provide this second type of neutral short test. To provide this flexibility to the circuit of FIG. 3 switches 26 and 49 can be connected through a common reference point and a variable resistor to ground 22 (similar to the circuit of FIG. 6). The operation of this circuit is the same as that described for the circuit of FIG. 3 with the exception of the neutral short test. Here, for the neutral short test, if there is no interrupt on tripping switch 26, variable resistor 48 is adjusted to the rated value of the G.F.I. as described. Then, with switch 26 still tripped, switch 49 is tripped. Variable resistor 50 and the added variable resistor are either preset or adjusted until the G.F.I. interrupts as is described for variable resistor 50 of FIG. 3.

To provide a three phase circuit tester with the ability to test the second type G.F.I. for a neutral short, the circuit of FIG. 5 is provided with the same circuit elements described, hereinbefore, in the modification of the circuit of FIG. 4 to obtain the circuit of FIG. 7. The operation of this new circuit is the same as described for the circuit of FIG. 5 with the exception of the neutral short test. Here the neutral short test is the same as described for the circuit of FIG. 7.

As will be apparent to those familiar with the art, the invention may be embodied in other specific forms without departing from the spirit or essential characteristics thereof.

I claim:

1. An electrical device for testing a ground fault interrupter comprising:

a plug with a plurality of prongs designated as ground, neutral and charged, said prongs being dimensioned to be received in correspondingly designated receptacles of a ground fault interrupter or a circuit protected by a ground fault interrupter;

circuit means in the device connected across each prong designated as charged and the ground prong to determine if the charged prong is received by a charged receptacle;

circuit means connected across each charged prong and the ground prong to create a current differential between the prongs received by the charged and neutral receptacles, said current differential means including a switch connected in series with an impedance element capable of drawing a current equal to the trip current of the apparatus being tested; and circuit means connected across the neutral and ground prongs to short circuit the neutral prong to a low impedance ground.

2. The device of claim 1 wherein said means to determine whether a prong designated as charged is received by a charged receptacle includes a lamp and a resistor connected in series.

3. The device of claim 1 wherein said impedance element is of the type whose impedance is variable.

4. The device of claim 1 wherein said short circuit means includes a switch connected in series with an impedance element.

5. The device of claim 1 wherein said short circuit means includes:

a first switch and a first impedance element connected in series across the prong received by the neutral receptacle and a reference point;

a second impedance element across the reference point and the prong received by the ground receptacle; and at least one series of elements including a second switch and a third impedance element connected across the prong received by the charged receptacle and the reference point, said third impedance element being capable of drawing a current equal to the trip current of the apparatus being tested.

6. The device of claim 1 wherein the short circuit means includes:

a first impedance element across the prong received by the charged receptacle and a reference point;

a second impedance element across the prong received by the neutral receptacle and the reference point; and a third impedance element in series with a switch across the reference point and the prong received by the ground receptacle.

* * * * *